United States Patent
Ritter et al.

(10) Patent No.: US 10,817,754 B2
(45) Date of Patent: Oct. 27, 2020

(54) SYSTEMS AND METHODS FOR OBJECT CLASSIFICATION AND SELECTIVE COMPRESSION IN AERIAL IMAGERY

(71) Applicant: SLANTRANGE, INC., San Diego, CA (US)

(72) Inventors: Michael Ritter, San Diego, CA (US); Michael Milton, San Diego, CA (US); Peter Matusov, San Diego, CA (US)

(73) Assignee: SLANTRANGE, INC., San Diego, CA (US)

( * ) Notice: Subject to any disclaimer, the term of this patent is extended or adjusted under 35 U.S.C. 154(b) by 166 days.

(21) Appl. No.: 15/499,442

(22) Filed: Apr. 27, 2017

(65) Prior Publication Data

US 2017/0316282 A1 Nov. 2, 2017

Related U.S. Application Data

(60) Provisional application No. 62/328,449, filed on Apr. 27, 2016.

(51) Int. Cl.
  *G06K 9/62* (2006.01)
  *G06K 9/20* (2006.01)
  *G06K 9/00* (2006.01)

(52) U.S. Cl.
  CPC ....... *G06K 9/6267* (2013.01); *G06K 9/00657* (2013.01); *G06K 9/2018* (2013.01)

(58) Field of Classification Search
  None
  See application file for complete search history.

(56) References Cited

U.S. PATENT DOCUMENTS

| | | | | |
|---|---|---|---|---|
| 2011/0007819 A1* | 1/2011 | Chen | ...................... | H04N 19/63 375/240.19 |
| 2013/0169811 A1* | 7/2013 | Smitherman | .......... | G01C 11/02 348/148 |
| 2015/0071528 A1* | 3/2015 | Marchisio | ............ | G06K 9/6269 382/159 |
| 2015/0356721 A1* | 12/2015 | Li | ............................ | G06K 9/46 382/110 |
| 2016/0050840 A1* | 2/2016 | Sauder | ................. | A01B 79/005 701/3 |

* cited by examiner

*Primary Examiner* — Matthew C Bella
*Assistant Examiner* — Brian D Shin
(74) *Attorney, Agent, or Firm* — Pillsbury Winthrop Shaw Pittman LLP

(57) ABSTRACT

This disclosure describes a system and a method for assigning pixels within agricultural imagery collected from overhead platforms to one or more classes based on spectral and/or spatial content. The system comprises one or more hardware processors configured by machine-readable instructions to: receive output signals provided by one or more remote sensing devices mounted to an overhead platform, the output signals conveying information related to one or more agricultural images; and assign pixels within the agricultural images to one or more classes based on spectral and/or spatial content of the agricultural images, wherein the one or more classes include a signal class and a noise class.

18 Claims, 4 Drawing Sheets

(2 of 4 Drawing Sheet(s) Filed in Color)

SYSTEMS AND METHODS FOR OBJECT CLASSIFICATION AND SELECTIVE COMPRESSION IN AERIAL IMAGERY

CROSS REFERENCE TO RELATED APPLICATIONS

This application claims the priority benefit of U.S. Provisional Patent Application No. 62/328,449 filed on Apr. 27, 2016 and entitled "SYSTEMS AND METHODS FOR COMPRESSION OF AGRICULTURAL IMAGERY COLLECTED FROM AIRBORNE PLATFORMS," which is incorporated herein by reference.

FIELD OF THE DISCLOSURE

This disclosure relates to systems and methods for object classification and selective compression in aerial imagery.

BACKGROUND

Airborne and spaceborne data collection systems have been employed to replace and/or complement human labor in scouting for issues within agricultural crops. Such systems include manned and unmanned aerial systems (UAS). Current systems employ expensive, complex, and processor-intensive methods to extract meaningful information from the measurements taken by instruments aboard them.

Airborne imaging systems that are limited to low altitudes and narrow fields of view must collect numerous individual images in order to provide total coverage of a subject target. These individual images (which may number in the thousands depending on field size, altitude, and sensor field of view) are traditionally aggregated into a larger single image mosaic in order to extract meaningful information. This process is commonly referred to as "mosaicking" or "stitching" and existing methods are inadequate for multiple reasons.

While very high resolution imagery enables valuable new classes of information to be created, the volumes of raw data that may be generated, and/or the limited means to effectively analyze, transmit, and/or consume that data have become obstacles to technology adoption. This may be particularly the case for agricultural uses which have an immense diversity of application scenarios and for which multispectral and/or hyperspectral imagers are commonly employed where data volumes may be multiplied by the number of independent spectral bands in use. For example (using common specifications), to obtain a simple 4-band multispectral image of a 160-acre field at a ground sample dimension (GSD) of 5 cm with an imager format size of 1280×1024 and 80% image overlap as may be commonly required by image "stitching" tools, nearly 5,000 image frames may be required at a raw data size of nearly 39 GB.

The current art provides two fundamental approaches to analyzing, transporting, and/or consuming this information: Desktop Processing—Raw data collected by overhead assets may be physically transported via storage media to a desktop processing suite that may be within relative proximity to the point of data collection, the processing suite's software analyzes the raw data and/or produces a common set of data type results that may be consumed by a decision maker at the point of processing and/or may be transmitted electronically; and Cloud Processing—Raw data collected by overhead assets may be transmitted electronically via cellular and/or other network-enabled device to a centralized processing server ("cloud") for analysis, upon completion of the analysis, a common set of data type results may be transmitted electronically to a decision maker for consumption.

Each of these approaches may have distinct disadvantages. Desktop Processing requires expensive, high-end computing resources to be reasonably co-located with the point of collection. Given the vast extents of agricultural areas and/or the relative expense of additional computing resources, this may often be infeasible. Cloud Processing relies upon raw data to be uploaded to a cloud server from the point of collection and/or a physically proximate location with network access. Agricultural production regions however, particularly within the developing world, may often be disadvantaged with regard to network access of sufficiently high bandwidth and/or economic viability to enable this process. Furthermore, a common set of data type results which have been developed for generic vegetation measurement have limited value to the very specific application needs of individual crop types and conditions.

To mitigate data volume and network bandwidth/accessibility constraints, traditional image compression techniques may be applied to reduce the raw data volume however these may be applied indiscriminately with regard to signal (plant) and/or noise (background soils, shadows, specular reflections, weeds, and/or other noise). The result may be a compromise between compression ratio and/or data quality degradation.

SUMMARY

One aspect of the present disclosure relates a system for assigning pixels within agricultural imagery collected from overhead platforms to one or more classes based on spectral and/or spatial content. The system comprises one or more hardware processors configured by machine-readable instructions to: receive output signals provided by one or more remote sensing devices mounted to an overhead platform, the output signals conveying information related to one or more agricultural images; and assign pixels within the agricultural images to one or more classes based on spectral and/or spatial content of the agricultural images, wherein the one or more classes include a signal class and a noise class.

Another aspect of the present disclosure relates to a method for assigning pixels within agricultural imagery collected from overhead platforms to one or more classes based on spectral and/or spatial content. The method comprises: receiving output signals provided by one or more remote sensing devices mounted to an overhead platform, the output signals conveying information related to one or more agricultural images; and assigning pixels within the agricultural images to one or more classes based on spectral and/or spatial content of the agricultural images, wherein the one or more classes include a signal class and a noise class.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
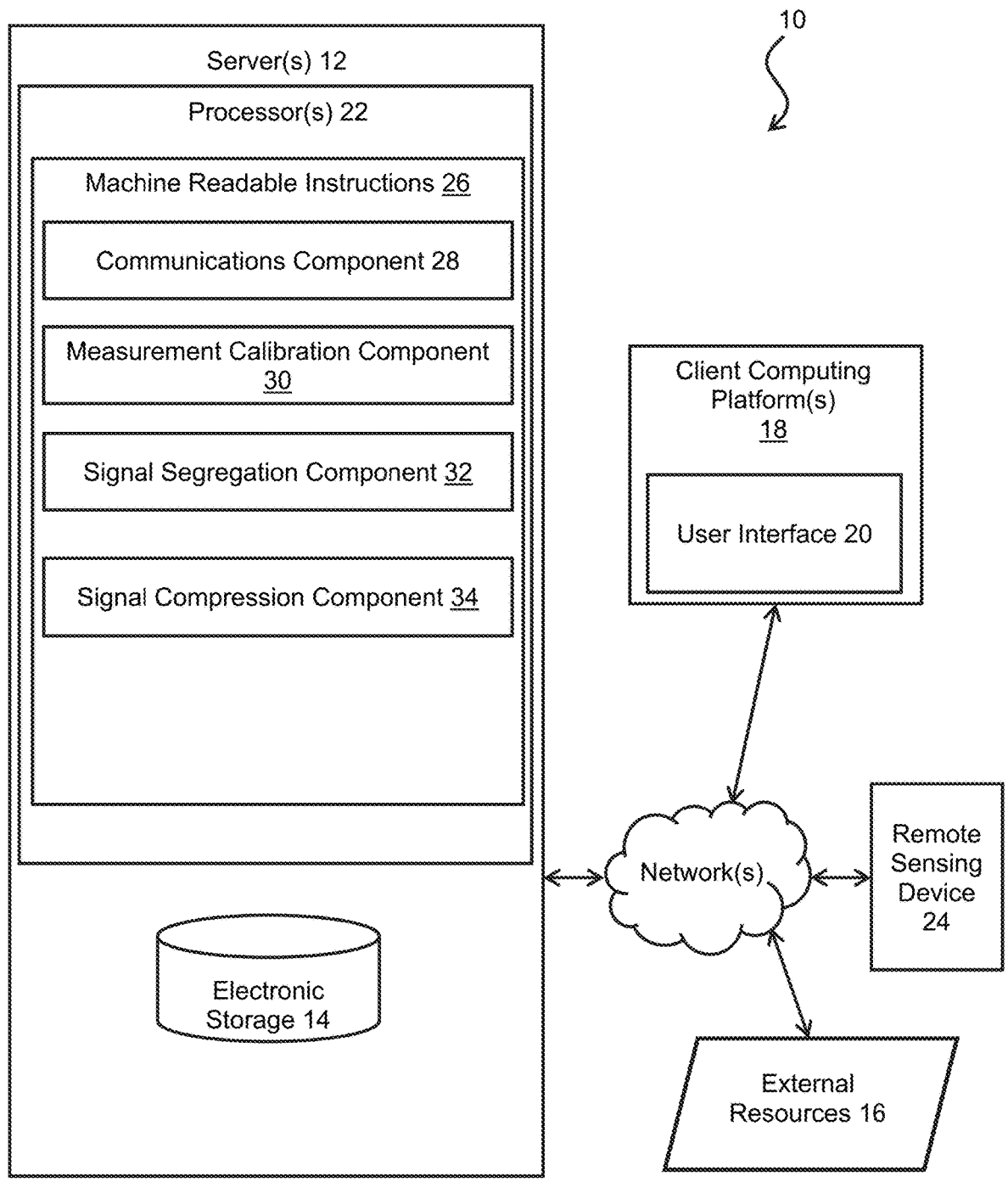
FIG. 1 illustrates an exemplary system for assigning pixels within agricultural imagery collected from overhead platforms to one or more classes, in accordance with one or more implementations.

Aerial imagery is finding increasing use throughout a number of industries as a result of multiple converging factors. For example: decreasing size, weight, power, and/or cost of high pixel density camera systems (particularly specialized multispectral and/or hyperspectral systems) which operate across broad regions of the electromagnetic spectrum; decreasing size, weight, power, and/or cost of high capacity solid state memory; decreasing cost and/or increasing autonomy of airborne collection assets, most notably small unmanned aerial systems (sUAS), more commonly referred to as "drones"; and/or increasing utility of derived data products that result from image processing, computer vision, and/or big data analytics.

Agriculture, in particular, may be an industry benefitting from these advances. While airborne and/or spaceborne imagery may have been applied to agricultural applications for decades to assess general crop health conditions, the recent availability of economically-viable systems which may deliver very high resolution imagery (i.e. imagery of sufficient resolution to measure individual plant leaves or other characteristics) may be opening new possibilities for data products of increased value. Examples include: An efficient means to detect nutrient deficiencies, dehydration conditions, pest infestations, invasive species, and/or other health conditions over very large survey areas; An ability to quantify specific crop variables such as population density, plant size and shape characteristics, vegetation fraction or canopy closure, plant biomass, and/or others; An ability to measure other pertinent field variables such as soil, topographic, and irrigation conditions; An ability to quantify livestock count, location, and health condition; and An improved ability to forecast future estimates of these conditions and yields.

While very high resolution imagery enables valuable new classes of information to be created, the volumes of raw data that may be generated, and/or the limited means to effectively analyze, transmit, and/or consume that data have become obstacles to technology adoption. This may be particularly the case for agricultural uses which have an immense diversity of application scenarios and for which multispectral and/or hyperspectral imagers are commonly employed where data volumes may be multiplied by the number of independent spectral bands in use.

The algorithmic techniques described herein enables, either through user input or through automation, the definition and segregation of signal and/or noise pixels into classes using spectral and/or spatial characteristics. Once segregated, the pixel groupings may be selectively and differentially analyzed and compressed per class assignment. One or more implementations may provide an ability for independent users to customize data type results for diverse application scenarios at the point and location of analysis, no loss of data quality for classes of interest, but very high compression rates on pixels classified as noise. In some implementations, spectral discrimination techniques may be used with computer vision algorithms to spatially segregate signal classes for selective analysis and compression. One or more implementations may have particular value for low-altitude imaging measurements of agricultural crops where large volumes of image data may be collected at very high resolution (where the ground resolved dimension (GRD) may be smaller than the characteristic dimension of the target signal (e.g., plant leaves)). One or more implementations may represent an improvement over the existing art which relies upon traditional image compression techniques that provide for no selective bias of compression rates between signal and noise. For example, FIG. 2 A illustrates an uncompressed spectral image of two corn rows (top) comprising both signal and noise pixels, and the same image with pixels belonging to multiple "noise" classes labeled (bottom right) which have little or no value to the observer, and an image compressed with a technique (JPEG) common in the current art (bottom left). Moreover, this process in one or more implementations, may be employed at the point of data collection (e.g., on-board the aircraft) such that downstream processes including additional analysis for derived data products, storage, and/or electronic distribution via cellular and/or other networks may be greatly facilitated, particularly in regions with disadvantaged access to broadband network and/or computing resources.

FIG. 1 illustrates a system 10 configured for object classification and selective compression in overhead imagery, in accordance with one or more implementations. In some implementations, system 10 may include one or more remote sensing devices 24. In some implementations, system 10 may include one or more server 12. Server(s) 12 may be configured to communicate with one or more client computing platforms 18 and/or one or more remote sensing devices 24 according to a client/server architecture. The users may access system 10 via a user interface 20 of client computing platform(s) 18. In some embodiments, one or more components of system 10 are located on the overhead platform (altogether or in parts) (e.g., server(s) 12, client computing platform 18, remote sensing device 24, external resources 16, and/or other components of system 10. In some embodiments all the components of system 10 are located on the overhead platform. In some embodiments, only some of the components of system 10 are located of the overhead platform.

The one or more remote sensing devices 24 may be mounted to an overhead platform. In some implementations, the overhead platform may include one or more of an aircraft, a spacecraft, an unmanned aerial vehicle, a drone, a tower, a vehicle, a tethered balloon, farming infrastructure such as center pivot irrigation systems or other infrastructure, and/or other overhead platforms. In some implementations, the one or more remote sensing devices 24 may be configured to provide output signals. The output signals may convey information related to one or more images of a land area where crops are grown. In some implementations, the one or more images may include one or more spectral measurements. For example, the one or more images may include one or more of a color measurement, a multi-spectral measurement, a hyperspectral measurement, and/or other spectral measurements of a land area where crops are grown. In some implementations, the one or more remote sensing devices 24 may record two-dimensional images of the land area where crops are grown formed on a single or multiple focal plane arrays. For example, a color or multispectral measurement may be formed through multiple spectral filters applied to individual pixels in a single focal plane array, or through spectral filters applied to entire focal plane arrays in a multiple focal plane array configuration.

In some implementations, the one or more images may have a spatial resolution that enables detecting individual plants within the crop population. In some implementations, the one or more images may have a spectral resolution that enables resolving spectral differences between growing vegetation and background clutter. In some implementations, the measurements may be of sufficient resolution such that the ground resolved dimension (GRD) is smaller than a characteristic dimension of one or more target plants, or scenes in the land area. In some implementations, the target scene may include objects of interest to the observer ("signals") as well as objects of lesser and/or no interest to the observer ("noise") (e.g., FIG. 2A). For the case of agricultural crops, in some implementations, signals may include photons which have been reflected and/or emitted from the interior of individual crop plant cells under direct illumination from the sun and/or other illumination sources. In some implementations noise may include photons which have been reflected and/or emitted from soils, shadowed regions of crop plant material, the external surface of crop or other plants, weeds and/or vegetation other than the crop of interest, standing water, dead vegetation, man-made features and/or equipment, and/or other detritus. In some implementations, objects defined as signal and/or noise may be defined differently and/or interchangeably depending upon the information needs of the observer.

In some implementations, the one or more remote sensing devices 24 may provide output signals conveying information related to one or more of a time stamp, a position (e.g., latitude, longitude, and/or altitude), an attitude (e.g., roll, pitch, and/or yaw/heading), a spectral measurement of solar irradiance, calibration information specific to the device, and/or other information corresponding to individual ones of the one or more images. In some implementations, calibration may include adjusting the one or more images for sunlight conditions, systemic errors, or positioning the image onto the earth's surface for output mapping. In some implementations, the one or more remote sensing devices 24 may provide output signals conveying information related to one or more environmental parameters, time stamp, the position, the attitude, and/or other information corresponding to individual ones of the one or more images. For example, the one or more environmental parameters may include spectral measurements of downwelling solar illuminance, temperature, relative humidity, and/or other weather or environmental conditions. In some implementations, output signals conveying information related to one or more environmental parameters, time stamp, the position, the attitude, and/or other information may be utilized to calibrate the one or more spectral images. In some implementations, the output signals may be synchronous to the one or more images. For example, each image may include the output signals as metadata whose time of validity corresponds to the image.

Returning to FIG. 1, the server(s) 12 and/or client computing platform(s) 18 may be configured to execute machine-readable instructions 26. The machine-readable instructions 26 may include one or more of a communications component 28, measurement calibration component 30, a signal segregation component 32, signal compression component 34, and/or other components.

Machine-readable instructions 26 may facilitate classification and selective compression of aerial imagery based on overhead optical measurements. In some implementations, communications component 28 may receive output signals provided by one or more remote sensing devices mounted to an overhead platform. In some implementations, the output signals may include one or more spectral images, metadata related to the one or more spectral images, and/or other information. The output signals may convey information related to one or more images of a land area where crops are grown. In some implementations, the one or more images may be spatially resolved and spectrally resolved. In some implementations, spatially resolved images may include one or more images corresponding to crop plants, non-crop plants, a land area, and/or other locations. In some implementations, the one or more images may include individual pixels corresponding to a spectral range. In some implementations, the individual pixels may include intensity values corresponding to the spectral range. For example, the one or more remote sensing devices may include a first camera having a red filter thereon and a second camera having a near infrared filter thereon. An image captured by the first camera may include pixel values indicating intensity in the red spectral range and an image captured by the second camera may include pixel values indicating intensity in the near infrared spectral range. In some implementations, the output signals may include one or more channels. In some implementations, multiple channels may be part of a single remote sensing device. In some implementations, multiple channels may be part of multiple remote sensing devices. In some implementations, each image may be created by a channel. In some implementations, each image created by a channel may be both spatially and spectrally resolved. In some implementations, individual channels may have a similar spatial resolution. In some implementations, different spectral ranges may be resolved in each channel. In some implementations, a stack of images may be based on the one or more channels. In some implementations, the spectral and spatial resolution of the sensor may be sufficient to provide an initial discrimination of signal from noise.

The GRD of the combined sensor/aircraft system, while in a typical data collection flight, may be smaller than the characteristic dimension of the object of interest. GRD includes components of sensor angular resolution, observation distance, flight speed, angular velocity, and/or exposure time, among others. The characteristic dimension may be defined as the square root of the area of a single element of the object of interest (e.g., a leaf). For example, a leaf under direct illumination from the sun and/or other sources, with a cross-sectional area of 25 cm$^2$ from the viewing geometry and perspective of the sensor, may have a characteristic dimension of 5 cm.

In some implementations, measurement calibration component 30 may be configured to calibrate measurements and/or images received from remote sensor 24 (or communications component 28). In some implementations, measurement calibration component 30 may calibrate the measurements (or images) based on calibration parameters and/or or other metadata necessary to eliminate sensor artifacts, systematic errors, and/or environmental variables to produce calibrated measurements and/or images. For example, measurement calibration component 30 may correct and/or revise systematic and environmental errors common to spectral imaging systems as described, for example in U.S. patent application Ser. No. 14/480,565, filed Sep. 8, 2014, and entitled "SYSTEM AND METHOD FOR CALIBRATING IMAGING MEASUREMENTS TAKEN FROM AERIAL VEHICLES" which is hereby incorporated into this disclosure by reference in its entirety. In some implementations, measurement calibration component 30 may revise one or more intensity non-uniformities of the one or more images. The one or more intensity non-uniformities may be results from characteristics of one or more collection optics. In some implementations measurement calibration component 30 may revise one or more spatial distortions of the one or more images. The one or more spatial distortions may be due to one or more characteristics of the collection optics. In some implementations, measurement calibration component 30 may revise one or more variations in intensity that result from changes in solar irradiance of the one or more images. For example, measurement calibration component 30 may utilize one or more of a collocated solar spectrometer, a solar intensity measurement, a reflectance standard, and/or other calibration device or technique to revise the one or more images for variations in solar irradiance.

In some implementations, signal segregation component 32 may be configured to optimally classify individual target measurements (pixels) as belonging to one or more target classes. In some implementations, classes may be defined by an operator through a user interface (e.g., user interface 20) at the time of analysis or may be predefined for automated analysis. In some embodiments, for example, a user may view data and select regions of interest as belonging to a class through user interface 20. In some cases, the user selection may be used as a reference by signal segregation component 32 (or by other components within system 10). In some implementations, segregation component 32 may be configured to determine spectral and/or spatial characteristics of the reference (whether generated by an operator input or predefined). In some implementations, segregation component 32 may be configured to compare individual pixels (from the measurements) to the reference (e.g., compare spectral and/or spatial characteristics of the pixels with the spectral and/or spatial characteristics of the reference.) In some implementations, segregation component 32 may be configured to assign classification to the individual pixels based on the comparison. In some implementations, pixels having similar spectral and/or spatial characteristics as the reference may be assigned the same class as the reference.

In some implementations, characteristics defining a class may include one or more of: spectral content, object size, object shape, patterns of object distribution across a target area, or other characteristics.

In some implementations, signal segregation component 32 may be configured to segregate measurements into classes using differing spectral reflectance intensities and/or ratios across multiple wavelength bands. For example, commonly used spectral ratios such as the Normalized Difference Vegetation Index (NDVI) may be used to classify growing vegetation distinct from other objects through the use of a threshold (growing vegetation typically may have a higher NDVI value than other objects). Once classified, the pixel locations of signal and/or noise sources within the image may be recorded. For example, in some implementations, signal segregation component 32 may be configured to determine an NDVI threshold value. The threshold value may be selected to segregate pixels containing vegetation signals from pixels containing other objects. In some implementations, signal segregation component 32 may compare each pixel value to the threshold value.

In some implementations, signal segregation component 32 may be configured to segregate image regions corresponding to vegetation from image regions corresponding to the non-vegetation as described, for example in U.S. patent application Ser. No. 15/268,370, filed Sep. 16, 2016, and entitled SYSTEMS AND METHODS FOR DETERMINING STATISTICS OF PLANT POPULATIONS BASED ON OVERHEAD OPTICAL MEASUREMENTS which is hereby incorporated into this disclosure by reference in its entirety.

In some cases, signals may be misclassified through a comparative spectral reflectance test due to a commonality of spectral reflectance characteristics with different classes. For example, growing crop vegetation under shadow from nearby terrestrial sources may be misclassified as growing vegetation under direct sky illumination. In these cases, signal segregation component 32 may be configured to properly classify misclassified pixels by pixel locations with commonly low intensity values across multiple spectral channels.

It may often be the case that some signals may be misclassified due to spectral commonality among multiple signal classes. For example, weeds and/or other vegetation types not of the crop type of interest to the observer may be misclassified as belonging to the crop class. In this case, signal segregation component 32 may be configured to apply a segregation step to improve the classification results using spatial patterns in the image. The spatial patterns may include the spatial characteristics of individual plants and leaves and/or the spatial patterns of growth across multiple plants in a field. For example, weeds may be misclassified as crop plants if using only spectral reflectance comparisons. However, the size and shape of individual plants and the quasi-linear patterns of growth within planted crops may be used to classify vegetation as belonging to a crop or weed class.

Figure 2A:
FIG. 2A illustrates examples of uncompressed and compressed spectral images using traditional techniques.
Figure 2A:
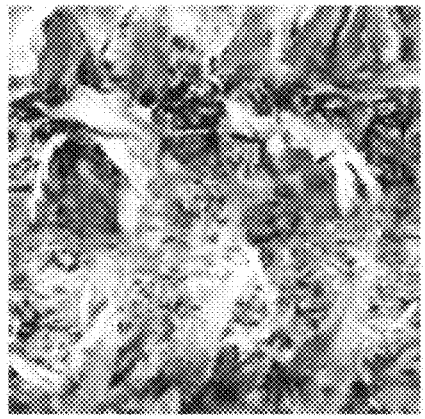
Figure 2A:
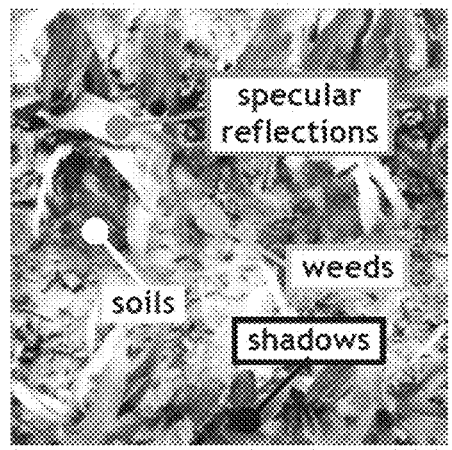
Figure 2B:
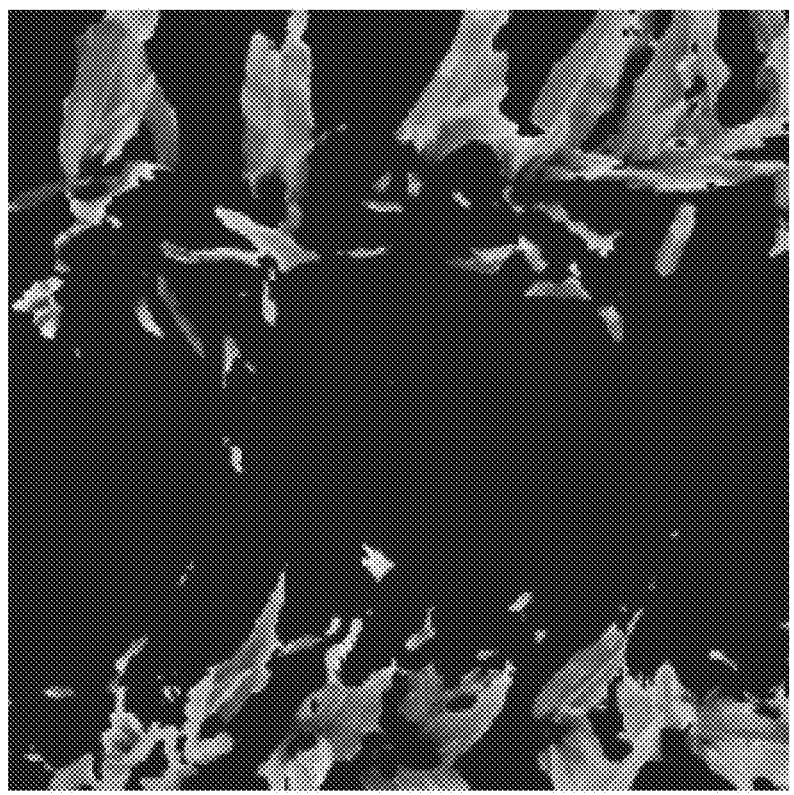
FIG. 2B illustrates an example of a compressed image, in accordance with one or more implementations.

In some implementations, signal compression components 34 may be configured to selectively compress the image pixels based on their signal class. For example, in some implementations, pixels belonging to signal classes of little or no value to the user may be replaced with zero values. In some implementations, pixels belonging to signal classes of little or no value to the user may be highly compressed. In some implementations, pixels belonging to signal classes of interest to the user (e.g., high value to the user) may retain their original values. In some implementations, pixels belonging to signal classes of interest to the user are not, or are lightly compressed. FIG. 2 B illustrates an example of a compressed image, in accordance with one or more implementations. FIG. 2B shows an example of a compressed image (of uncompressed image shown in FIG. 2A top) where, pixels belonging to signal classes of little interest to the user are replaced with zero values, and where pixels belonging to signal classes of interest to the user are not compressed. In some implementations, signal compression components 34 may be configured to provide (depending on image content) compression ratios of 10× or more over the existing techniques with no loss of signal quality for selected classes.

In some implementations, server(s) 12, client computing platform(s) 18, and/or external resources 16 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 12, client computing platform(s) 18, and/or external resources 16 may be operatively linked via some other communication media.

A given client computing platform 18 may include one or more processors configured to execute machine-readable instructions. The machine-readable instructions may be configured to automatically, or through an expert or user associated with the given client computing platform 18 to interface with system 10 and/or external resources 16, and/or provide other functionality attributed herein to client computing platform(s) 18. In some implementations, the one or more processors may be configured to execute machine-readable instruction components 28, 30, 32, 34, and/or other machine-readable instruction components. By way of non-limiting example, the given client computing platform 18 may include one or more of a desktop computer, a laptop computer, a handheld computer, a tablet computing platform, a NetBook, a Smartphone, a gaming console, and/or other computing platforms.

In some implementations, the one or more remote sensing devices 24 may include one or more processors configured to execute machine-readable instructions. The machine-readable instructions may be configured to automatically, or through an expert or user associated with the one or more remote sensing devices 24 to interface with system 10 and/or external resources 16, and/or provide other functionality attributed herein to the one or more remote sensing devices 24. In some implementations, the one or more processors may be configured to execute machine-readable instruction components 28, 30, 32, 34, and/or other machine-readable instruction components. In some implementations, the one or more remote sensing devices 24 may include processors 22 and electronic storage 14.

External resources 16 may include sources of information, hosts and/or providers of digital media items outside of system 10, external entities participating with system 10, and/or other resources. In some implementations, some or all of the functionality attributed herein to external resources 16 may be provided by resources included in system 10.

Server(s) 12 may include electronic storage 14, one or more processors 22, and/or other components. Server(s) 12 may include communication lines, or ports to enable the exchange of information with a network and/or other computing platforms. Illustration of server(s) 12 in FIG. 1 is not intended to be limiting. Server(s) 12 may include a plurality of hardware, software, and/or firmware components operating together to provide the functionality attributed herein to server(s) 12. For example, server(s) 12 may be implemented by a cloud of computing platforms operating together as server(s) 12.

Electronic storage 14 may comprise non-transitory storage media that electronically stores information. The electronic storage media of electronic storage 14 may include one or both of system storage that is provided integrally (i.e., substantially non-removable) with server(s) 12 and/or removable storage that is removably connectable to server(s) 12 via, for example, a port (e.g., a USB port, a firewire port, etc.) or a drive (e.g., a disk drive, etc.). Electronic storage 14 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 14 may include one or more virtual storage resources (e.g., cloud storage, a virtual private network, and/or other virtual storage resources). Electronic storage 14 may store software algorithms, information determined by processor(s) 22, information received from server(s) 12, information received from client computing platform(s) 18, and/or other information that enables server(s) 12 to function as described herein.

Processor(s) 22 is configured to provide information processing capabilities in server(s) 12. As such, processor(s) 22 may include one or more of a digital processor, an analog processor, a digital circuit designed to process information, an analog circuit designed to process information, a state machine, and/or other mechanisms for electronically processing information. Although processor(s) 22 is shown in FIG. 1 as a single entity, this is for illustrative purposes only. In some implementations, processor(s) 22 may include a plurality of processing units. These processing units may be physically located within the same device, or processor(s) 22 may represent processing functionality of a plurality of devices operating in coordination. The processor(s) 22 may be configured to execute machine-readable instruction components 28, 30, 32, 34, and/or other machine-readable instruction components. The processor(s) 22 may be configured to execute machine-readable instruction components 28, 30, 32, 34, and/or other machine-readable instruction components by software; hardware; firmware; some combination of software, hardware, and/or firmware; and/or other mechanisms for configuring processing capabilities on processor(s) 22.

It should be appreciated that although machine-readable instruction components 28, 30, 32, and/or 34, are illustrated in FIG. 1 as being implemented within a single processing unit, in implementations in which processor(s) 22 includes multiple processing units, one or more of machine-readable instruction components 28, 30, 32, and/or 34 may be implemented remotely from the other components and/or sub-components. The description of the functionality provided by the different machine-readable instruction components 28, 30, 32, and/or 34 described herein is for illustrative purposes, and is not intended to be limiting, as any of machine-readable instruction components 28, 30, 32, and/or 34 may provide more or less functionality than is described. For example, one or more of machine-readable instruction components 28, 30, 32, and/or 34 may be eliminated, and some or all of its functionality may be provided by other ones of machine-readable instruction components 28, 30, 32, and/or 34. As another example, processor(s) 22 may be configured to execute one or more additional machine-readable instruction components that may perform some or all of the functionality attributed below to one of machine-readable instruction components 28, 30, 32, and/or 34.

Figure 3:
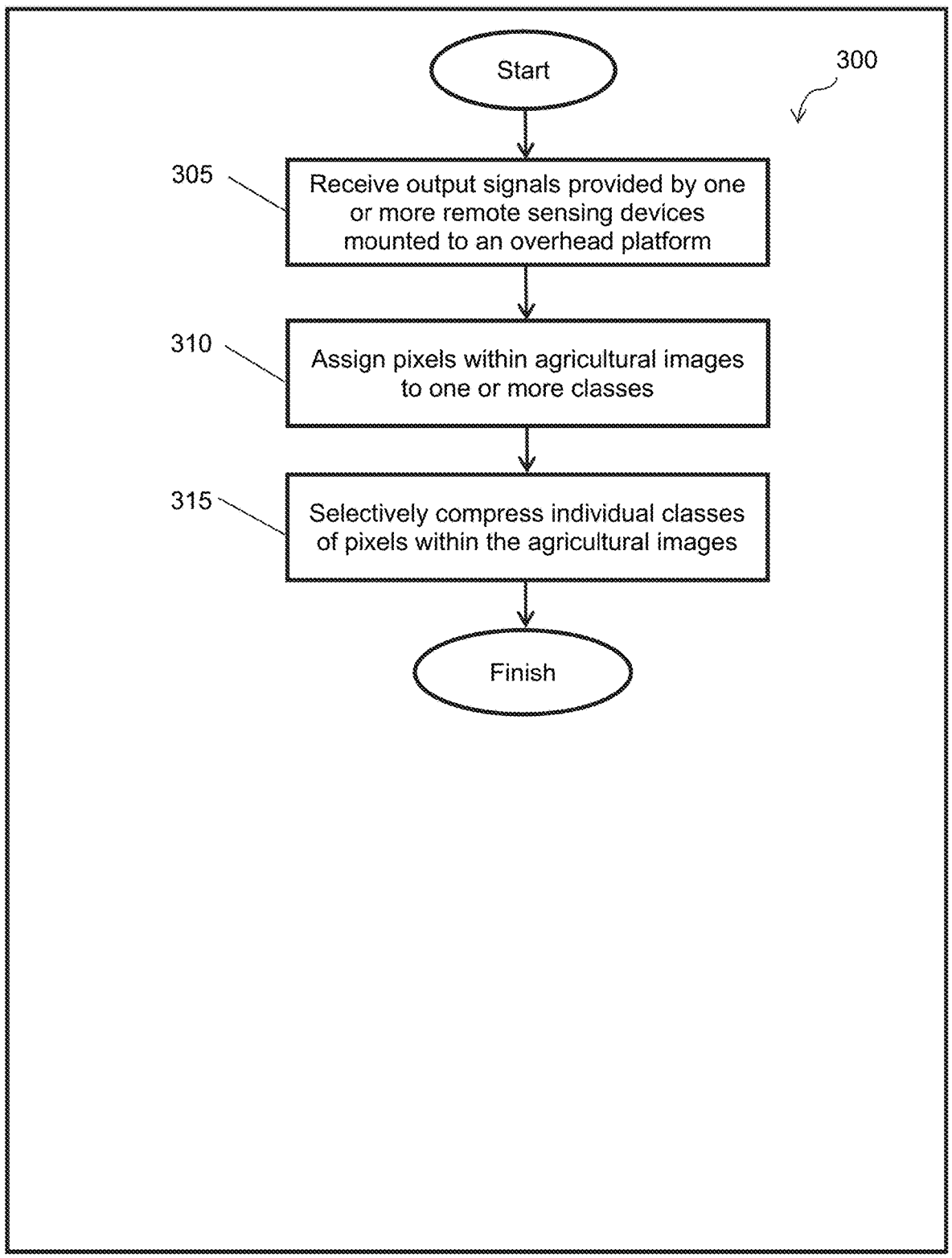
FIG. 3 illustrates an exemplary system in which one or more implementations may be realized.

FIG. 3 illustrates a method 300 for assigning pixels within agricultural imagery collected from overhead platforms to one or more classes based on spectral and/or spatial content, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 305, output signals provided by one or more remote sensing devices mounted to an overhead platform may be received. In some implementations, the output signals may convey information related to one or more agricultural images. Operation 305 may be performed by one or more hardware processors configured to execute a machine-readable instruction component that is the same as or similar to communications component 28 (as described in connection with FIG. 1), in accordance with one or more implementations.

At an operation 310, pixels within the agricultural images may be assigned to one or more classes. In some implementations, the pixels within the agricultural images may be assigned to one or more classes based on spectral and/or spatial content of the agricultural images. In some implementations, the one or more classes include a signal class and a noise class. Operation 310 may be performed by one or more hardware processors configured to execute a machine-readable instruction component that is the same as or similar to contrast signal segregation component 32 (as described in connection with FIG. 1), in accordance with one or more implementations.

At an operation 315, individual classes of pixels within the agricultural images may be selectively compressed. Operation 315 may be performed by one or more hardware processors configured to execute a machine-readable instruction component that is the same as or similar to signal compression component 34 (as described in connection with FIG. 1), in accordance with one or more implementations.

Although the present technology may have been described in detail for the purpose of illustration based on what may be currently considered to be the most practical and/or preferred implementations, it may be to be understood that such detail may be solely for that purpose and/or that the technology may not be limited to the disclosed implementations, but, on the contrary, may be intended to cover modifications and/or equivalent arrangements that may be within the spirit and/or scope of the appended claims. For example, it may be to be understood that the present technology contemplates that, to the extent possible, one or more features of any implementation may be combined with one or more features of any other implementation.

What is claimed is:

1. A system configured for assigning pixels within agricultural imagery collected from overhead platforms to one or more classes, the system comprising:
  non-transitory storage media storing machine readable instructions configured to cause one or more hardware processors to:
    receive output signals provided by one or more remote sensing devices mounted to an overhead platform, the output signals conveying information related to one or more agricultural images;
    assign one or more pixels within the agricultural images to one or more classes based on one or more characteristics of a pixel or group of pixels, the one or more characteristics comprising one or more of: spectral content, object size, object shape, or patterns of object distribution across a target area; and
    differentially compress pixel classes within the agricultural images based on a class value defined by a user or the system;
  wherein the class value indicates relative interest of a class to the user or to subsequent processing steps, and wherein the one or more hardware processors are configured such that classes of lesser interest to the user or to subsequent processing steps are compressed more heavily than classes of higher interest to the user or to subsequent processing steps.

2. The system of claim 1, wherein the one or more hardware processors are further configured by the machine readable instructions to:
  calibrate the agricultural images based on calibration parameters, the calibration parameters comprising environmental and systematic parameters.

3. The system of claim 1, wherein the one or more classes include a signal class and a noise class, and wherein the one or more hardware processors are further configured by the machine readable instructions to:
  segregate signal classes based on one or more comparative spectral reflectance characteristics.

4. The system of claim 1, wherein the one or more classes include a signal class and a noise class, and wherein the one or more hardware processors are further configured by the machine readable instructions to:
  segregate signal classes based on one or more reflectance intensity characteristics.

5. The system of claim 1, wherein the one or more classes include a signal class and a noise class, and wherein the one or more hardware processors are further configured by the machine readable instructions to:
  segregate signal classes based on one or more spatial patterns.

6. The system of claim 5, wherein the spatial patterns include spatial characteristics of individual plants and leaves in a field.

7. The system of claim 5, wherein the spatial patterns include spatial patterns of growth across multiple plants in a field.

8. The system of claim 1, wherein the one or more hardware processors are further configured by the machine readable instructions to assign the one or more pixels within the agricultural images to the one or more classes based on entry or selection of a region of interest in an agricultural image by a user through a user interface.

9. The system of claim 1, wherein the one or more hardware processors are further configured by the machine readable instructions to define the one or more characteristics of spectral content, object size, object shape, and/or patterns of object distribution across a target area based on user selection in a user interface.

10. A method for assigning pixels within agricultural imagery collected from overhead platforms to one or more classes, the method comprising:
  receiving output signals provided by one or more remote sensing devices mounted to an overhead platform, the output signals conveying information related to one or more agricultural images;
  assigning one or more pixels within the agricultural images to one or more classes based on one or more characteristics of a pixel or group of pixels, the one or more characteristics comprising one or more of: spectral content, object size, object shape, or patterns of object distribution across a target area; and differentially compressing pixel classes within the agricultural images based on a class value defined by a user or the system;

wherein the class value indicates relative interest of a class to the user or to subsequent processing steps, and classes of lesser interest to the user or to subsequent processing steps are compressed more heavily than classes of higher interest to the user or to subsequent processing steps.

11. The method of claim 10, further comprising:

calibrating the agricultural images based on calibration parameters, the calibration parameters comprising environmental and systematic parameters.

12. The method of claim 10, wherein the one or more classes include a signal class and a noise class, and further comprising:

segregating signal classes based on one or more comparative spectral reflectance characteristics.

13. The method of claim 10, wherein the one or more classes include a signal class and a noise class, and further comprising:

segregating signal classes based on one or more reflectance intensity characteristics.

14. The method of claim 10, wherein the one or more classes include a signal class and a noise class, and further comprising:

segregating signal classes based on one or more spatial patterns.

15. The method of claim 14, wherein the spatial patterns include spatial characteristics of individual plants and leaves in a field.

16. The method of claim 14, wherein the spatial patterns include spatial patterns of growth across multiple plants in a field.

17. The method of claim 10, further comprising assigning the one or more pixels within the agricultural images to the one or more classes based on entry or selection of a region of interest in an agricultural image by a user through a user interface.

18. The method of claim 10, further comprising defining the one or more characteristics of spectral content, object size, object shape, and/or patterns of object distribution across a target area based on user selection in a user interface.

* * * * *